United States Patent [19]
Tsuji et al.

[11] Patent Number: 5,436,431
[45] Date of Patent: Jul. 25, 1995

[54] TONER IMAGE FIXING DEVICE HAVING IMPROVED LAMP HEATER

[75] Inventors: Masaru Tsuji, Nara; Hiroshige Araki, Yamatokooriyama; Hideki Gotoh, Osaka; Yoshikazu Kondoh, Izumiohtsu; Atsuyuki Kato, Tenri; Yoshinobu Tateishi, Shiki; Yuhi Akagawa, Ikoma; Mitsuyoshi Terada, Nara; Takashi Sugito, Tenri; Toshihide Ohgoshi; Naoyuki Yamane, both of Yamatokooriyama, all of Japan

[73] Assignee: Sharp Kabushiki Kaisha, Osaka, Japan

[21] Appl. No.: 178,785

[22] Filed: Jan. 7, 1994

[30] Foreign Application Priority Data

Feb. 19, 1993 [JP] Japan .................. 5-055170

[51] Int. Cl.6 .................................. G03G 15/20
[52] U.S. Cl. .................................. 219/216; 219/469; 355/289
[58] Field of Search .............. 219/216, 469; 355/282, 355/285, 289, 290; 432/60

[56] References Cited

U.S. PATENT DOCUMENTS

| | | | |
|---|---|---|---|
| 3,720,808 | 3/1973 | Morrissey | 219/469 |
| 4,554,434 | 11/1985 | Bailleul et al. | 219/216 |
| 4,618,240 | 10/1986 | Sakurai et al. | 219/216 |
| 4,736,226 | 4/1988 | Mogi | 355/290 |
| 4,868,368 | 9/1989 | Araki | 219/216 |
| 5,115,119 | 5/1992 | Adachi et al. | 219/469 |
| 5,140,132 | 8/1992 | Shiokawa | 219/216 |
| 5,241,159 | 8/1993 | Chatteriee et al. | 219/216 X |

FOREIGN PATENT DOCUMENTS

| | | |
|---|---|---|
| 0074769 | 5/1982 | Japan . |
| 57-82961 | 5/1982 | Japan . |
| 0200262 | 11/1983 | Japan . |
| 0082281 | 3/1990 | Japan . |
| 0197908 | 8/1990 | Japan . |
| 0145473 | 5/1992 | Japan . |

Primary Examiner—Robert Beatty
Attorney, Agent, or Firm—David G. Conlin; Milton Oliver

[57] ABSTRACT

A toner image fixing device comprises a heat roller and a lamp heater. The lamp heater is formed from a nicrome wire stretched between clamp terminals, a silica tube and ceramic holders closely fitted to respective ends of the silica tube and which have an external diameter which is substantially the same as the diameter of the heating roller. The lamp heater is secured by a lamp holder and frame to the shaft of the heat roller. The heat roller is rotatably supported by a bearing and is driven by a driving gear.

4 Claims, 9 Drawing Sheets

TONER IMAGE FIXING DEVICE HAVING IMPROVED LAMP HEATER

BACKGROUND OF THE INVENTION

The present invention relates to a toner image fixing device and, more particularly, to the structure of a toner image fixing portion for a laser printer or a copying machine and to a method for controlling the temperature of the heater of the fixing portion.

A toner image fixing device is intended for fixing a toner image onto a sheet of paper by fusion. The heating is done by using a heating means either in contact with a sheet of paper or at a distance therefrom. A fixing heated-roller method is usually adopted.

The fixing heated-roller method is such that a toner image developed with toner on a sheet of paper is fixed by means of heating while the paper passes through a fixing roller which is heated at a specified temperature by a heater that is axially mounted thereon and a paper presser and a feeding roller rotate while in contact with the fixing roller.

In the past, a conventional fixing heater was used such as a halogen lamp that was a silica tube having a tungsten filament mounted therein and filled with an inert gas containing a very small amount of halogen. The lamp produced Joule's heat when an electric current flowed through the tungsten filament having a high melting point.

Japanese laying-open patent No. 57-82961 (Appl. No. 55-158843) describes a conventional halogen lamp for use in copying machines, which is a transparent body made of quartz glass accommodating a tungsten coil filament containing doping elements as a light emitting portion and filled with inert gas and reactive carrier gas.

The referred prior art is concerned with a halogen lamp filled with gas. The present invention relates to a heating roller, which includes a nichrome wire heater in a silica tube with open ends, and to a new method of temperature control for the heating roller.

A conventional halogen lamp-heater which is composed of a silica tube with terminals fitted at the respective ends thereof with a seal of molybdenum foil and with a doubly coiled tungsten filament stretched between the terminals within the silica tube. The sealed silica tube is filled with an inert gas containing a very small amount of halogen. Both terminals have respective lead wires connected to the tungsten filament which is heated by an electric current supplied from an external power source through the lead wires.

The heating portion H of the halogen lamp is a coiled portion of the tungsten filament. However, a region A near each terminal portion may become hot by heat conduction. The molybdenum foil is a sealing material having a coefficient of thermal expansion selected to prevent leakage of the halogen gas from the silica tube but it may be oxidized at temperatures higher than 350° C., resulting in the deterioration of its sealing quality. To avoid this, the sealing portion is provided with a means for protecting against the rise of the temperature therein.

As described previously, the length and position of the heating portion H are determined by the maximum width of a sheet of paper onto which a toner image is to be fixed. When the conventional halogen heating lamp was designed in order for the sealed portion to have a molybdenum foil at a temperature not higher than 350° C., the lamp was necessarily elongated in order to have the elongated non-heating portions A, B and C (e.g., not shorter than 30 mm). As a result, the fixing unit was enlarged and the copying machine had an increased width.

When a heater made of, e.g., nichrome wire, having a large heating capacity which does not require filling with halogen gas nor the use of molybdenum foils, is used in the fixing portion of a laser printer or copy machine working under severe temperature conditions, the conventional temperature control method cannot regulate the temperature within a constant range, i.e., the temperature will vary from the preset range.

SUMMARY OF THE INVENTION

It is an object of the present invention to provide a temperature control method whereby a small-sized, inexpensive lamp heater equipped with a nichrome wire is to be used as a toner image fixing device which does not require filling with halogen gas and, therefore, eliminates the need of a sealing material, and is capable of stabilizing the temperature near a preset value in order to stabilize the fixing of the toner image in a laser printer or a copy machine.

It is another object of the present invention to provide a nichrome wire heater, which has a silica tube containing a nichrome wire stretched therein by means of clamp terminals made of stainless steel, is simple in construction and inexpensive to manufacture since it does not require filling with halogen gas and using sealing material (e.g. molybdenum foil) which are necessary in the conventional heater.

It is another object of the present invention to provide a clamp terminals which made of stainless steel having high heat stability may be used at a temperature higher than 350° C. which is the limit to molybdenum foil of the conventional heater. Therefore, the heater can have a reduced size from the heating portion of the heater to the external terminal end.

While the conventional halogen lamp cannot attain heat insulation to prevent radiation from the heating roller ends because of the existence of the molybdenum foil seal, the heating roller, according to the present invention, is provided with sufficient heat insulation to easily get a temperature slope at the ends of the heating roller. By virtue of this, the heating roller, according to the present invention, may have a reduced size (shorter by about 20 mm than the conventional heating roller using a halogen lamp therein).

It is another object of the present invention to provide a toner image fixing device, which the surface temperature of the heating roller is measured at a specified interval and at time ratios for switching the heater ON and OFF. All is determined according to the temperature sensed. At this time, the duration of the ON-state of the heater is determined by two factors, i.e., the current temperature and the difference between the temperature measured theretofore at a specified time interval and the current temperature. This method can accurately control the temperature of the nichrome wire heater which is inexpensive but has a large heating capacity. Use of the nichrome wire heater is effective to considerably save the manufacturing costs of the heating roller.

A toner image fixing device is constructed as a freely rotatable heating roller which contains a fixed silica tube having ceramic holders of high heat insulation capacity with clamp terminals firmly fitted in both ends thereof and a nichrome wire stretched between the clamp terminals therein. The device is also provided with a temperature control which is capable of sensing the surface temperature of the heating roller at a specified interval and of determining the frequency of the switching ON and Off of the power supply of the nichrome wire heater according to the temperature sensed. The duration of the ON state of the heater is determined from two factors, i.e., the currently measured temperature and the difference between the currently measured temperature and the temperature measured just prior to the specified time interval. By doing so, it becomes possible to use an inexpensive nichrome wire heater in such devices which normally require extreme conditions of temperature control.

To address the above-mentioned problems, the present invention features a toner image fixing device with a cylindrical heating roller having an opening at both ends and being rotatably supported, a lamp portion for heating the heating roller and a lamp holder for supporting the lamp inside the heating roller, said lamp portion including a cylindrical silica tube having an opening at both ends, a nichrome wire stretched inside the silica tube, clamp terminals holding the respective ends of the nichrome wire, and holders fitted at the ends in the respective end openings of the silica tube to hold the respective clamp terminals of the nichrome wire.

PREFERRED EMBODIMENT OF THE INVENTION

Figure 1:
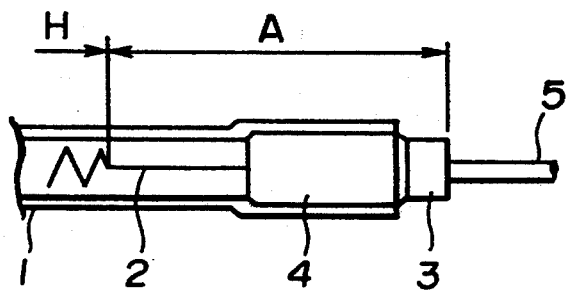
FIG. 1 is a fragmentary longitudinal view of the prior art halogen lamp heater.

FIG. 1 is a partial vertical section of a conventional halogen lamp-heater which is composed of a silica tube 1 with terminals 3 fitted at the respective ends thereof with a seal 4 of molybdenum foil and with a doubly coiled tungsten filament 2 stretched between the terminals within the silica tube. The sealed silica tube is filled with an inert gas containing a very small amount of halogen. Both terminals have respective lead wires 5 connected to the tungsten filament 2 which is heated by an electric current supplied from an external power source through the lead wires 5.

The heating portion H of the halogen lamp is a coiled portion of the tungsten filament 2. However, a region A near each terminal portion 3 may become hot by heat conduction. The molybdenum foil 4 is a sealing material having a coefficient of thermal expansion selected to prevent leakage of the halogen gas from the silica tube 1 but it may be oxidized at temperatures higher than 350° C., resulting in the deterioration of its sealing quality. To avoid this, the sealing portion 4 is provided with a means for protecting against the rise of the temperature therein.

Figure 2:
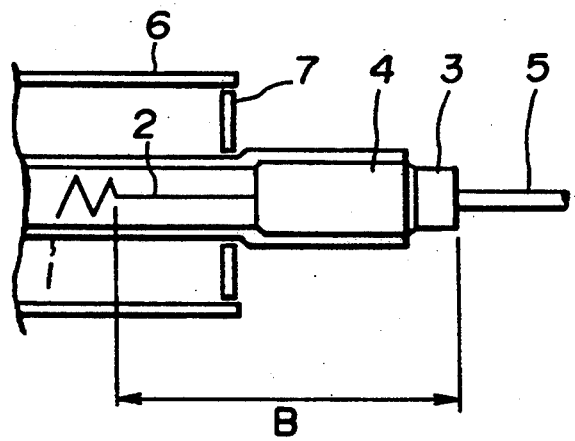
FIG. 2 is a view showing a radiation structure of a sealing portion of a prior art halogen lamp.
Figure 3:
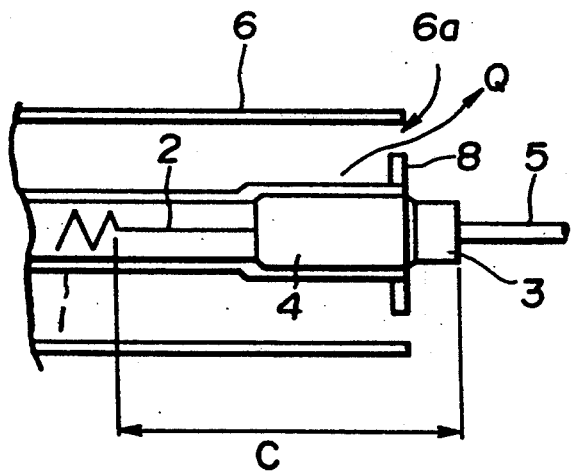
FIG. 3 is a view showing a radiation structure of a sealing portion of a prior art halogen lamp.

FIGS. 2 and 3 are views for radiating structures of sealing portions 4 of conventional halogen lamps. The radiating structure of FIG. 2 is such that the whole terminal portion 3, including the sealing portion 4, is exposed to the atmosphere in order to be cooled by radiation while a portion of the silica tube 1 between the sealing portions 4 is inserted into a heating roller 6 and separated by heat insulating plates 7 to prevent a drop in the temperature of the heating roller 6.

The radiating structure of FIG. 3 is such that a sealed portion 4 is completely inserted in a heating roller 6 and provided with a heat insulating plate 8 of a diameter that is smaller than the inside diameter of the heating roller 6 in order to radiate heat through a gap 6a formed between the heat insulating plate 8 and the heating roller 6 as shown by the arrow Q thereby preventing a rise in temperature of the sealing portion.

The halogen lamp has an expensive tungsten filament and is filled in a silica tube 1 with halogen gas. By using a nichrome wire it is possible to provide an inexpensive heater which is smaller in size, not requiring filling with special gas. The usable nichrome wire, however, is thick and has a large heating capacity with a low thermal response. Therefore, the nichrome wire heater cannot be controlled by a conventional temperature control.

The conventional temperature control method for toner image fixing senses the surface temperature of a fixing roller through the use of a thermistor or the like and to regulate the current in the heating lamp's fixing roller according to a sensed value in order to maintain a constant temperature in the roller. In practice, the heater is turned ON and OFF according to the measured value of the surface temperature of the fixing roller. The heater is turned ON when the measured temperature is lower than the preset value and turned OFF when the measured temperature is higher than the preset value. For example, to maintain the surface temperature of the fixing roller at 165° C., it is possible to apply the following method of control as shown in Table 1.

TABLE 1

| Conventional temperature control method: | |
|---|---|
| Temperature (°C.) | Heater |
| Not lower than 165 | OFF |
| Not higher than 165 | ON |

Figure 4:
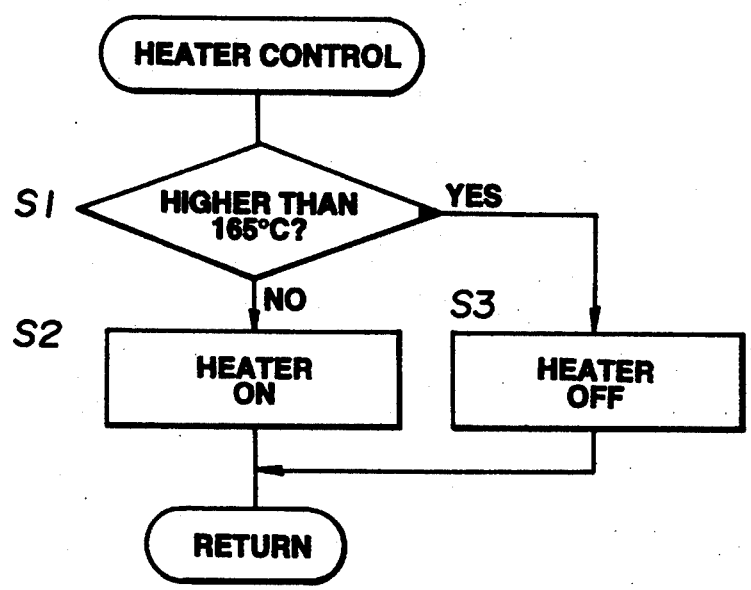
FIG. 4 is a flow chart showing a conventional temperature control.
Figure 5:
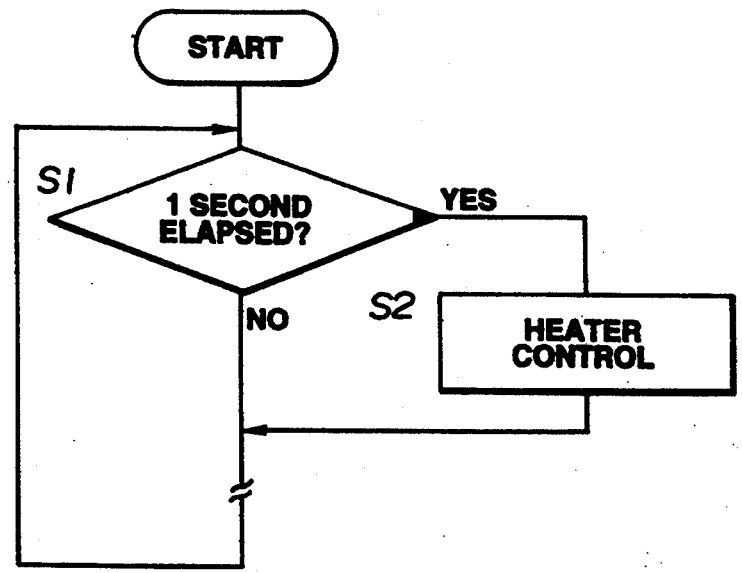
FIG. 5 is a view showing the conventional application of the temperature control flow chart of FIG. 4.

Referring to Table 1 and FIG. 4, the heater control will be explained as follows (FIG. 5 shows an example of an application of the method in FIG. 4):

As shown in FIG. 4, a measured temperature is first checked as to whether it is higher than 165° C. or not (Step 1). The heater is turned ON if the measured value is lower than 165° C. (Step 2) or the heater is turned OFF if the measured value is higher than 165° C. (Step 3). These steps are repeated to maintain the surface temperature of the fixing portion at a constant temperature.

As shown in FIG. 5, the temperature control begins and checks if 1 second has elapsed (Step 1). The process other than heating is made before 1 second has elapsed, and the heater control is activated after 1 second has elapsed (Step 2).

Figure 6:
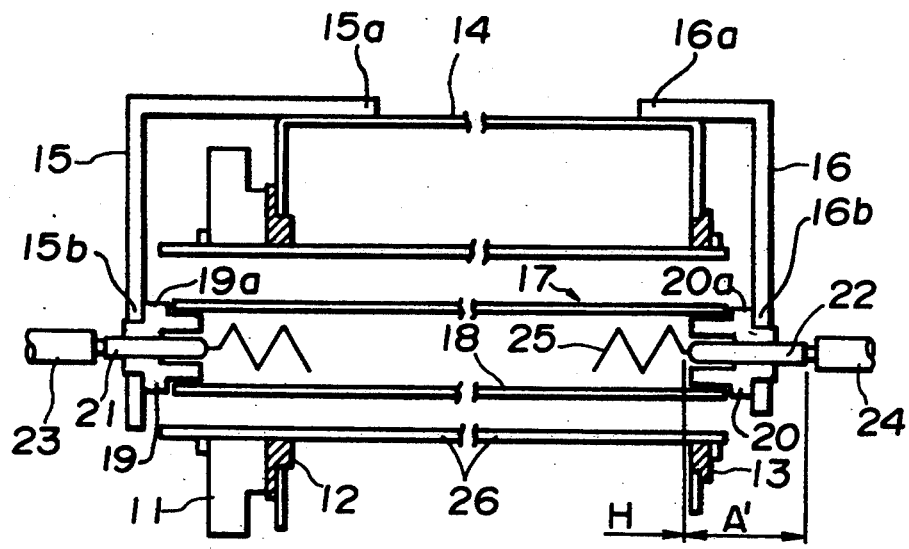
FIG. 6 is a construction view for explaining an example of a toner image fixing device embodied in the present invention.

Referring now to the accompanying drawings, the preferred embodiments of the present invention will be described in detail as follows:

FIG. 6 is a construction view for explaining an example of a toner image fixing device embodied in the present invention. Shown are a driving gear 11, bearings 12 and 13, a frame 14, lamp holders 15 and 16, a lamp (heating) portion 17, a silica tube 18, ceramic holders 19 and 20, periphery 19a and 20a, clamp terminals 21 and 22, lead wires 23 and 24, a nichrome wire 25 and a heating roller 26.

The lamp portion 17 is a silica tube 18 which has holders 16 made of a high adiabatic material (i.e., ceramics) and fitted on both ends, clamp terminals 21 and 22, made of stainless steel and pressed into the respective holders 16 and a nichrome wire 25 stretched and secured at both ends to the clamp terminals 21 and 22. The clamp terminals are provided with lead wires 23 and 24, connected to a heating power source. The shown ceramic holders 19 and 20, have the same cylindrical form with a flanged portion 20a having a diameter substantially the same as the external diameter of the silica tube.

The ceramic holders 19 and 20, are secured respectively to the ends 15b and 16b, of the lamp holders 15 and 16, of an L-shape. The other ends 15a and 16a, of the holders 15 and 16, are connected to the C-shaped frame 14 which serves as a supporting member for rotatably supporting the heating roller 26 by means of the bearings 12 and 13, axially holding the silica tube within the tube. The heating roller 26 has openings at both ends. A driving gear 11 is fitted onto one end of the heating roller 26 to transmit the rotational movement from the driving motor (not shown).

Figure 7:
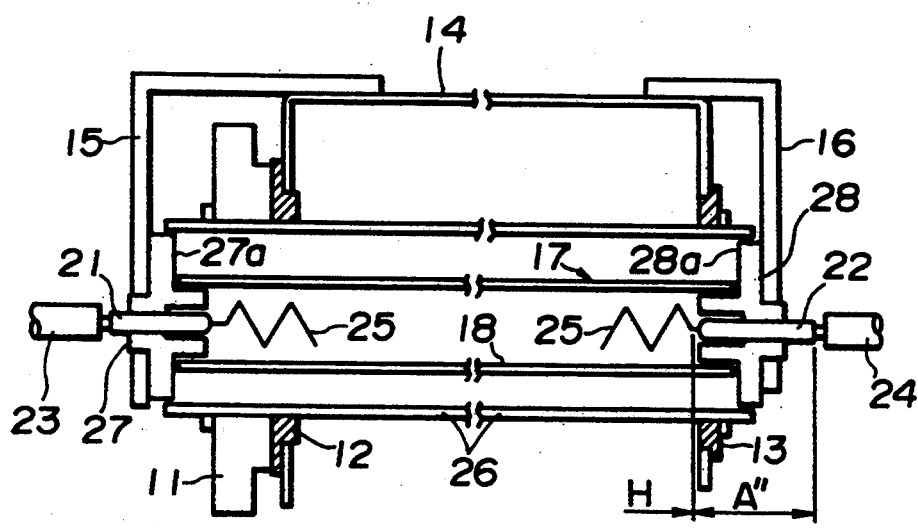
FIG. 7 is a view for explaining another embodiment of a toner image fixing device, according to the present invention.

FIG. 7 is a view for explaining another example of a toner image fixing device embodied in the present invention. Ceramic holders 28 and 29, are shown. Parts similar to those shown in FIG. 6 are designated by the same reference numerals.

The fixing device of FIG. 7 differs in construction from the device of FIG. 6 only by the ceramic holders 27 and 28, which have the same cylindrical form and have integrally formed flange at its periphery 27a and 28a, respectively. The external diameters of these flanged portions are substantially the same with the diameter of a heating roller 26.

Figure 8A:
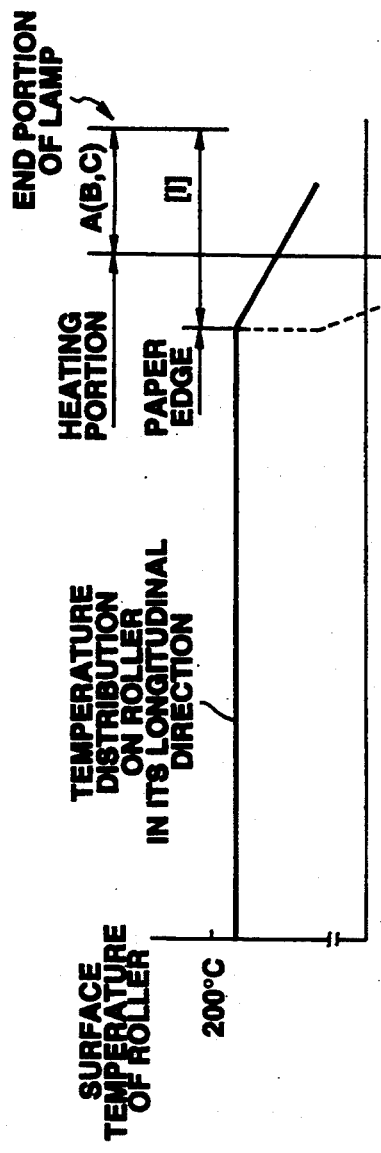
FIGS. 8A, 8B and 8C are a view for showing a comparison between an embodiment of the present invention and the prior art as regards the relationship between an edge-to-edge length of paper and the length of a lamp for fixing.
Figure 8B:
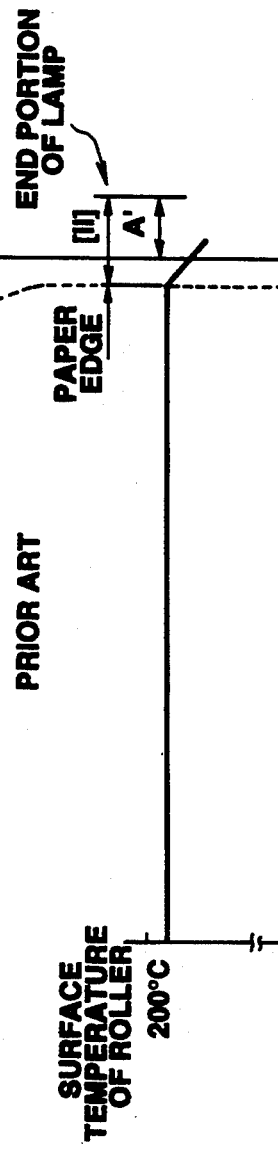
Figure 8C:
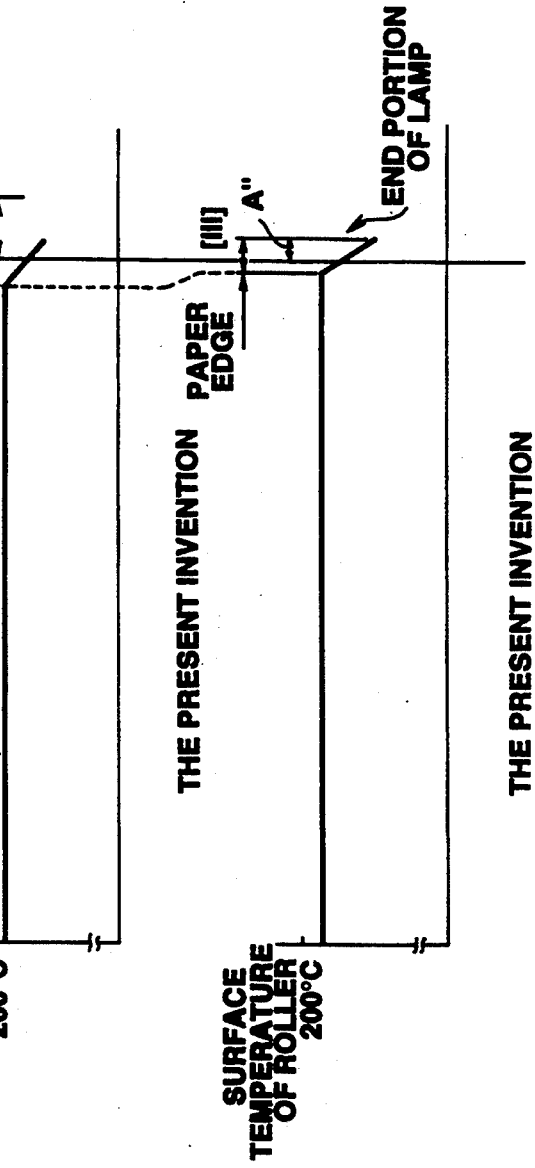

As shown in FIGS. 6 and 7, the lamp 17 of the fixing device has such a simple construction that a nichrome wire 25 is stretched axially within the silica tube 18 without needing any gas filling. This eliminates the necessity for using non-stable sealing materials and may increase the ratio of the length of the heating portion H to the total length of the heating lamp. The heating roller 26 can rotate about the axis of the heating lamp 17. The surface temperature of the heating roller 16 thus constructed 26 of the fixing device must be controlled at an even value all over the length of its heating portion that corresponds to the width of a sheet of paper on which the toner image is to be fused. This parameter of the fixing device of the present invention will be compared with that of the prior art:

FIGS. 8A, 8B and 8C show experimental data on the relationship between the length of an end portion of a heating lamp and the position of the edge of a sheet of printing paper whereon a toner image has been fixed by the prior art device FIG. 8A and the embodiments (FIG. 8B and FIG. 8C) of the present invention, respectively, for the purpose of comparison. FIG. 8A shows data on the prior art in FIG. 3 and FIGS. 8B and 8C show the data on the devices of FIGS. 6 and 7 according to the present invention. In these drawings, the temperature is plotted along the ordinate and the length along the abscissa. Figures A, B and C shown in FIG. 8A indicate the distances between the respective heaters' ends and the clamp terminals 3 shown in FIGS. 1, 2 and 3. Similarly, figures A' and A" indicate the distances between the ends of the nichrome wires 25 and clamp terminals 22 shown in FIGS. 6 and 7. As shown in FIGS. 8A, 8B and 8C, the distance from the lamp's end to the edge of the evenly heated paper is designated by [I] for the prior art device FIG. 8A and by [II] and [III] for the embodiments FIG. 8B and FIG. 8C of the present invention. The distance [III] is larger than the distance [II] which is larger than the distance [I]. Consequently, the sizes (width) of the devices are as shown FIG. 8C<FIG. 8B<FIG. 8A. The devices according to the present invention are smaller than the prior art.

Figure 9:
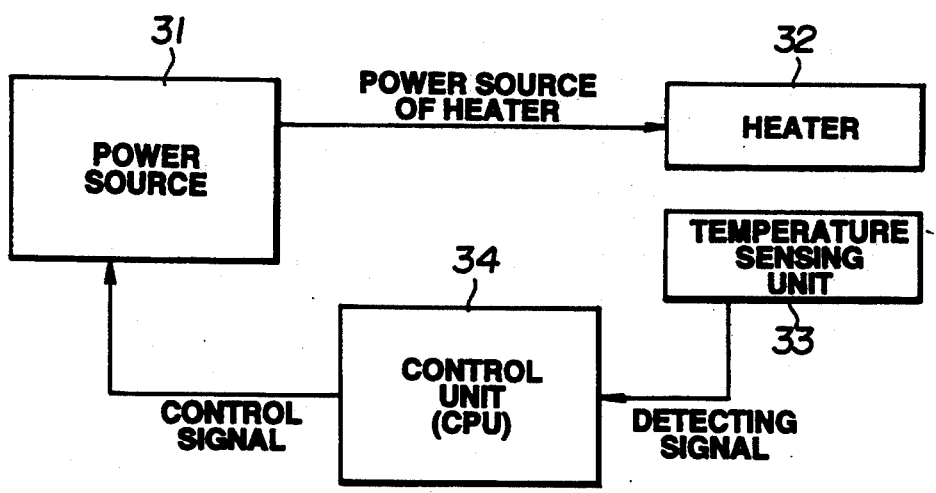
FIG. 9 is a construction view for explaining an example of a temperature control, according to the present invention.

FIG. 9 is a construction view for explaining an example of a temperature control unit for a toner image fixing device according to the present invention. In FIG. 9, there is shown a power source 31, a heater (nichrome wire) 32, a temperature sensing unit 33 and a temperature control unit 34.

The temperature sensing unit 33 senses the current temperature of the heater 32. The temperature control unit 34 generates a control signal according to the difference between the current temperature and the previous temperature measured at a specified time interval and sends it to the power source 31 which is turned ON or OFF to adjust the heating temperature to a predetermined value.

Figure 10:
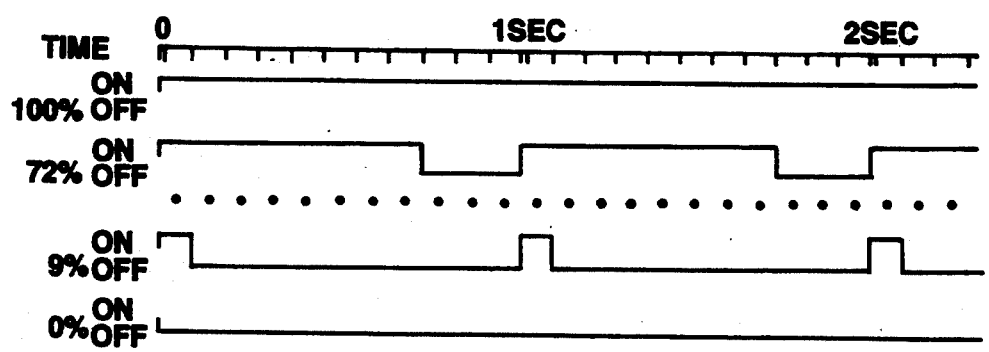
FIG. 10 is a time chart for explaining a temperature control method, according to the present invention.

FIG. 10 is a time chart for explaining a temperature control method according to the present invention. A duration of the ON state of the heater is determined by two factors, i.e., the currently measured temperature and the difference between the currently measured value and the value measured theretofore at a predetermined time interval. The preset temperature and the number of reference points of the preset temperature, the difference and the number of reference points of the differential temperature and the ratio of heater ON may be selected to be best suited from the results of experiments to be conducted. When it is desirable that the heater be maintained at a constant temperature of, e.g., 165° C., it is turned ON and OFF as shown in Table 2.

TABLE 2

Temperature Control Method according to the present invention

| Temperature (°C.) | The difference between the current temperature and that measured theretofore at a specified time interval | | | |
|---|---|---|---|---|
| | ... −1 | 0 | 1 | 2 ... |
| −166 | | 0% | | |
| 165 | | 9% | | |
| 164 | | 18% | | |
| 163 | | 27% | | |
| 162 | | 36% | | |
| 161 | | 54% | | |
| 160 | 72% | | | |
| 159–110 | | 100% | | |
| 109– | | | | |

Temperature measurements are conducted at an interval of about 1 second and the heater is turned ON and OFF according to FIG. 10. As shown in Table 2, the heater does not change its present state if the slop is 0 within the range of the temperature 165° C.–160° C. When the temperature varies, for example, 166° C.→165° C.→165° C.→164° C.→165° C., the inclination varies as 0%→9%→9%→18%→0%. In other words, when the current temperature is 166° C., the state is 0% irrespective of its difference from the preceding temperature and, therefore, the heater is turned OFF. When the current temperature changes to 165° C., the difference of the current temperature from the preceding one (166° C.) is −1 C. and, therefore, the control value is determined at 9% from the intersecting point of 165° C. and −1 according to Table 2. The heater is turned ON for 90 mSec. When the temperature changes to 165° C. again, the difference from the preceding value (165° C.) is 0 and the control value is determined at 9% from the intersecting point of lines 165° C. and 0 according to Table 2. The heater is turned ON for 90 msec. The temperature becomes 164° C. At this time, the difference from the preceding value (165° C.) is −1. Therefore, the control value is determined at 18% from the intersecting point of 164° C. and −1 according to Table 2. The heater is turned ON for 180 mSec. When the temperature changes to 165° C. again, the difference from the preceding value (164° C.) is +1 and, therefore, the control value is determined at 0% from the intersection point of 165° C. and +1 according to Table 2.

Figure 11:
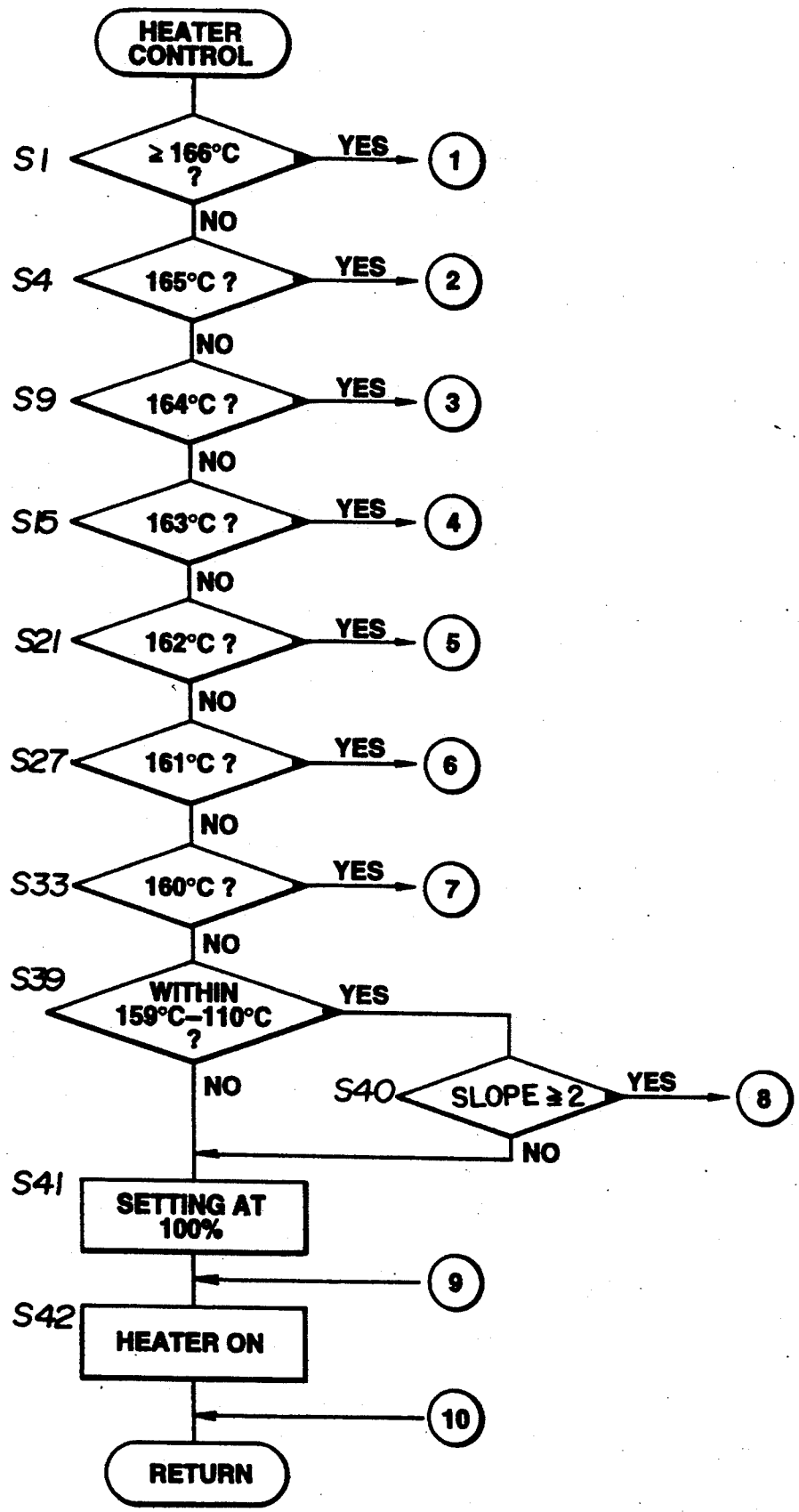
FIG. 11 is a flow chart (1) for controlling a heater, according to the present invention.
Figure 12:
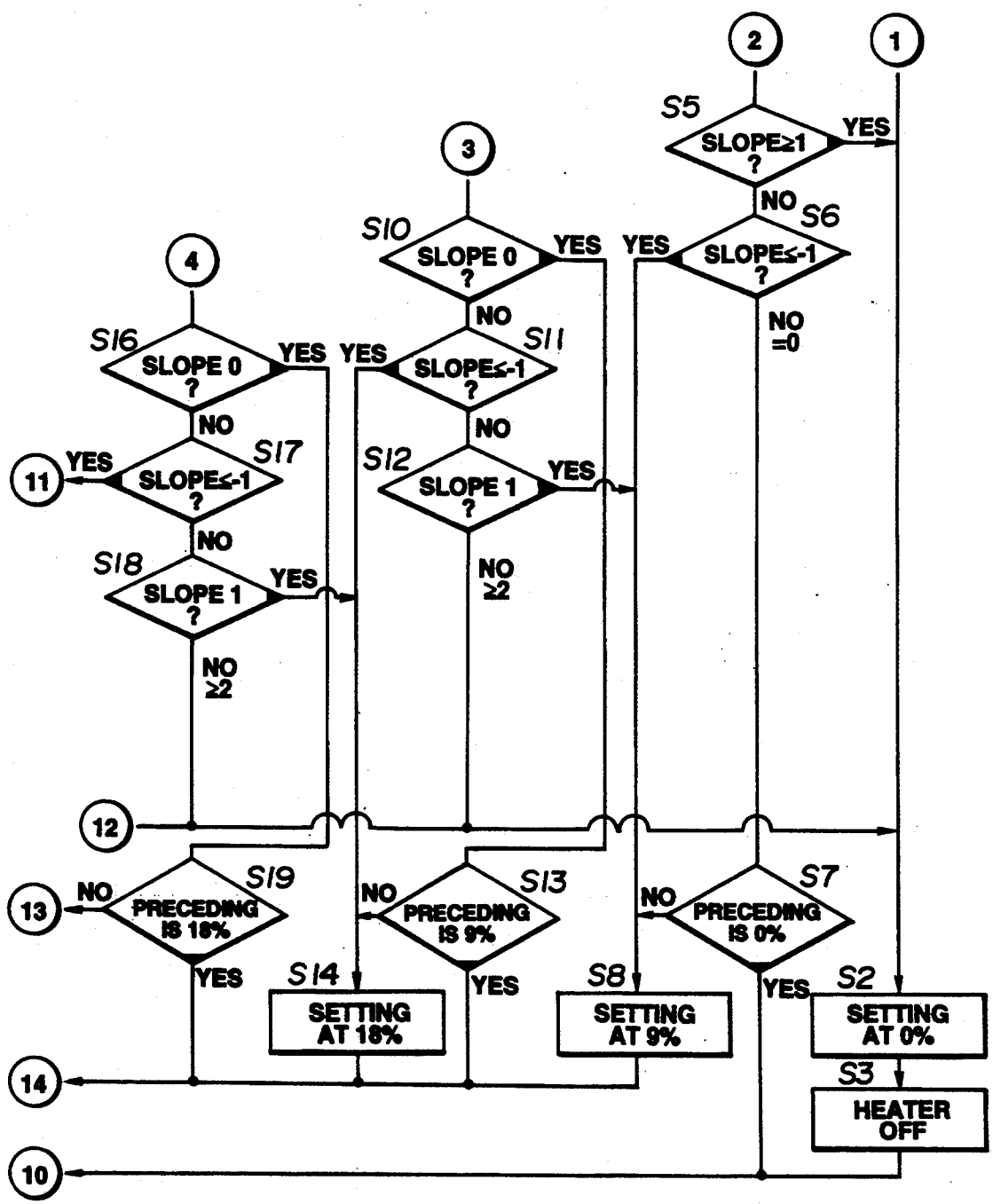
FIG. 12 is a flow chart (2) for controlling a heater, according to the present invention.
Figure 13:
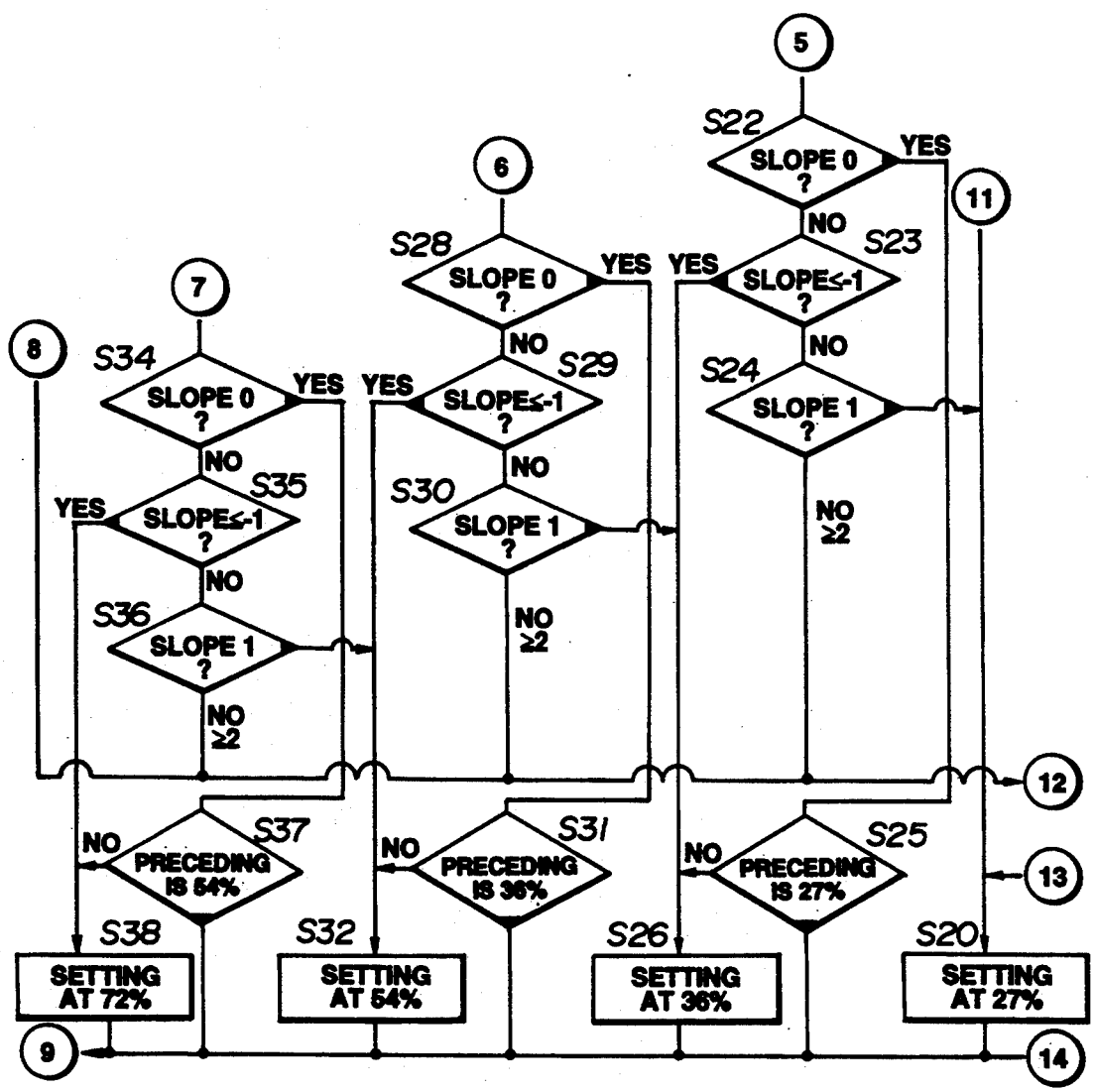
FIG. 13 is a flow chart (3) for controlling a heater according to the present invention.

In FIGS. 11, 12 and 13, there are shown flow charts for controlling the heater's temperature, comprising the following steps:

The temperature control unit checks whether the sensed temperature is not lower than 166° C. (at step 1). When the temperature is higher than or equal to 166° C., it sets the control value at 0% (at step 2) and turns OFF the heater (at step 3). When the temperature is lower than 166° C., the temperature control unit judges whether the temperature is not lower than 165° C. (at step 4). When the temperature is 165° C., the temperature control unit determines whether the slope is not less than 1 (at step 5). At the slope of no less than 1, the temperature control unit carries out the operation of step 2. At the slope of less than 1, the temperature control unit checks whether the slope is not more than −1 (at step 6). At the slope of no less than −1, it determines whether the preceding control value is 0% or not (at step 7). At the control value of 0%, the temperature control unit returns to the initial step. At the slope of less than −1 (at step 6), the temperature control unit sets the control value at 9% (at step 8). At the preceding control value of other than 0% (at step 7), the temperature control unit sets the control value at 9% (at step 8) and turns ON the heater.

When the temperature is lower than 165° C. at step 4, the temperature control unit judges whether the temperature is not lower than 164° C. (at step 9). When the temperature is higher than or equal to 164° C., the temperature control unit determines whether the slope is 0 or not (at step 10). When the slope is not 0, the temperature control unit determines whether the slope is not more than −1 (at step 11). When the slope is not less than −1, the temperature control unit determines whether the slope is 1 or not (at step 12). When the slope is not 1, the temperature control unit carries out the operation of step 2. At the slope of 0 at step 10, the temperature control unit determines whether the preceding slope is 9% or not (at step 13). At the control value of 9%, it turns ON the heater. When the control value is not 9%, it sets the control value at 18% (at step 14) and turns ON the heater. When the slope is less than −1 at step 11, the temperature control unit sets the control value at 18% (at step 14) and turns ON the heater. When the slope is 1 at step 12, the temperature control unit sets the control value at 9% (at step 8) and turns ON the heater.

When the temperature is lower than 164° C. at step 9, the temperature control unit checks whether the temperature is not lower than 163° C. (at step 15). When the temperature is higher than or equal to 163° C., the temperature control unit determines whether the slope is 0 or not (at step 17). When the slope is not 0, the temperature control unit determines whether the slope is not more than −1 or not (at step 17). When the slope is not less than −1, the temperature control unit determines whether the slope is 1 or not (at step 18). When the slope is not 1, the temperature control unit carries out the operation of step 2. At the slope of 0 at step 16, the temperature control unit determines whether the preceding slope is 18% or not (at step 19). At the control value of 18%, it turns ON the heater. When the control value is not 18%, it sets the control value at 27% (at step 20) and turns ON the heater. When the slope is less than −1 at step 17, the temperature control unit sets the control value at 27% (at step 20) and turns ON the heater. When the slope is 1 at step 18, the temperature control unit sets the control value at 18% (at step 14) and turns ON the heater.

When the temperature is lower than 163° C. at step 15, the temperature control unit judges whether the temperature is not lower than 162° C. (at step 21). When the temperature is higher than or equal to 162° C., the temperature control unit determines whether the slope is 0 or not (at step 22). When the slope is not 0, the temperature control unit determines whether the slope is not more than −1 or not (at step 23). When the slope is not less than −1, the temperature control unit determines whether the slope is 1 or not (at step 24). When the slope is not 1, the temperature control unit carries out the operation of step 2. At the slope of 0 at step 22, the temperature control unit determines whether the preceding slope is 27% or not (at step 25). At the control value of 27%, it turns ON the heater. At the control value being not 27%, it sets the control value at 36% (at step 26) and turns ON the heater. When the slope is less than −1 at step 23, the temperature control unit sets the control value at 36% (at step 26) and turns ON the heater. When the slope is 1 at step 24, the temperature control unit sets the control value at 27% (at step 20) and turns ON the heater.

When the temperature is lower than 162° C. at step 21, the temperature control unit judges whether the temperature is not lower 161° C. (at step 27). When the temperature is higher than or equal to 161° C., the the temperature control unit determines whether the slope is 0 or not (at step 28). When the slope is not 0, the temperature control unit determines whether the slope is not more than −1 or not (at step 29). When the slope is not less than −1, the temperature control unit determines whether the slope is 1 or not (at step 30). When the slope is not 1, the temperature control unit carries out the operation of step 2. At the slope of 0 at step 28, the temperature control unit determines whether the preceding slope is 36% or not (at step 31). At the control value of 36%, it turns ON the heater. At the control value being not 36%, it sets the control value at 54% (at step 32) and turns ON the heater. When the slope is less than −1 at step 29, the temperature control unit sets the control value at 54% (at step 32) and turns ON the heater. When the slope is 1 at step 30, the temperature control unit sets the control value at 54% (at step 26) and turns ON the heater. When the temperature is lower than 161° C. at step 27, the temperature control unit checks whether the temperature is higher than or equal to 160° C. (at step 33). When the temperature is 160° C., the temperature control unit determines whether the slope is 0 or not (at step 34). When the slope is not 0, the temperature control unit determines whether the slope is not more than −1 or not (at step 35). When the slope is not less than −1, the temperature control unit determines whether the slope is 1 or not (at step 36). When the slope is not 1, the temperature control unit carries out the operation of step 2. At the slope of 0 at step 34, the temperature control unit determines whether the preceding slope is 54% or not (at step 37). At the control value of 54%, it turns ON the heater. At the control value being not 54%, it sets the control value at 72% (at step 38) and turns ON the heater. When the slope is less than −1 at step 35, the temperature control unit sets the control value at 72% (at step 38) and turns ON the heater. When the slope is 1 at step 36, the temperature control unit sets the control value at 54% (at step 32) and turns ON the heater.

When the temperature is lower than 160° C. at step 33, the temperature control unit checks whether the temperature is within the range from 159° C. to 110° C. or not (at step 39). When the temperature is within 159° C.-110° C., the temperature control unit determines whether the slope is 2 or more (at step 40). When the slope is 2 or more, the temperature control unit goes to step 2. When the temperature is out of the range from 159° C. to 110° C. at step 39 and the slope is less than 2 at step 40, the temperature control unit sets the control value at 100% (at step 41) and turns ON the heater (at step 42).

Figure 14:
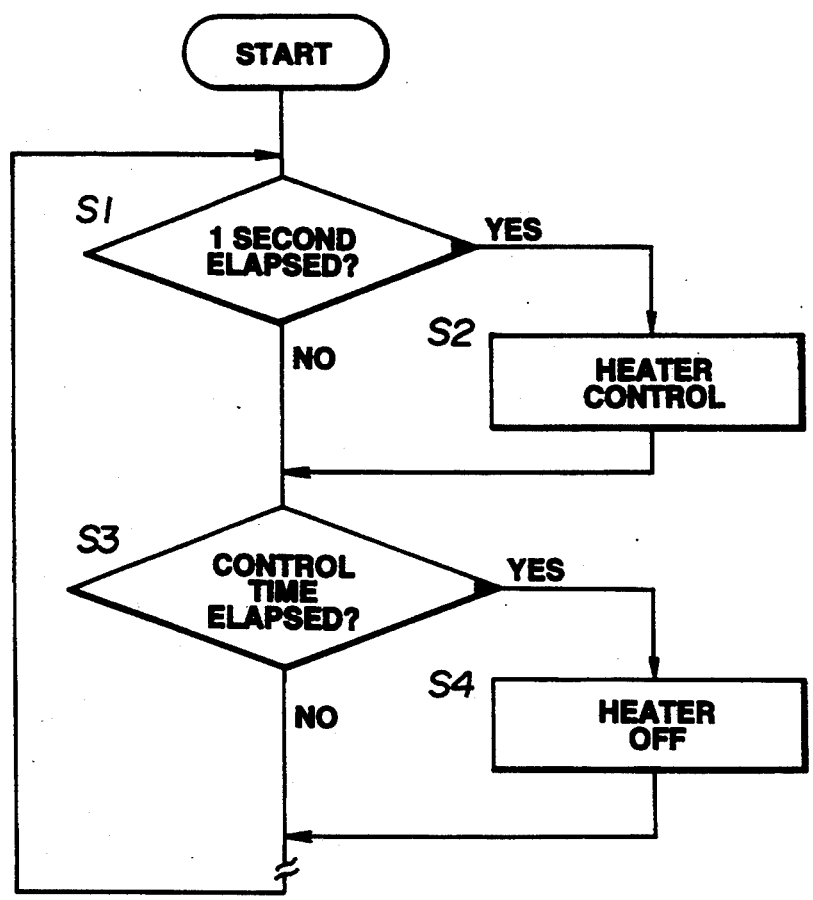
FIG. 14 is a view showing a main routine, according to the present invention.

FIG. 14 shows a main routine using a temperature control method according to the present invention. The routine starts the temperature control unit and then checks whether 1 second elapsed thereafter (at step 1). When 1 second has elapsed, the routine starts heater control (at step 2). If 1 second has not elapsed yet at step 1, the routine judges what is the control time ratio predetermined by the heater control unit and whether the control time has elapsed or not (at step 3). When the control time has elapsed, the routine turns OFF the heater (at step 4). When the control time did not elapse yet at step 3, the routine returns to step 1.

We claim:

1. A toner image fixing device, comprising
   a cylindrical heating roller having an opening at both ends and being rotatably supported,
   a lamp portion for heating the heating roller and a lamp holder for supporting the lamp inside the heating roller,
   said lamp portion including a cylindrical silica tube with an opening at both ends,
   a nichrome wire stretched inside the silica tube,
   clamp terminals holding the respective ends of the nichrome wire, and
   respective holders, each having a peripheral flange with an external diameter which is substantially the same as the diameter of the heating roller, and each fitted onto a respective end opening of the silica tube, to hold the respective clamp terminals of the nichrome wire.

2. A toner image fixing device as defined in claim 1, characterized in that the respective holders are made of a material having high heat insulation.

3. A toner image fixing device as defined in claim 2, characterized in that the respective holders are made of ceramics.

4. A toner image fixing device as defined in claim 1, further comprising
   a temperature-sensing means for sensing the surface temperature of the heating roller within a specified time interval, and
   a temperature-control means for determining a duration of an ON state of the heater as a function of the following two parameters: the currently measured temperature value and a difference value between said currently measured temperature value and a value previously measured by the temperature-sensing means.

* * * * *